United States Patent [19]

Toyama et al.

[11] Patent Number: 4,731,119

[45] Date of Patent: Mar. 15, 1988

[54] DESENSITIZING GUM FOR PLANOGRAPHIC PRINTING PLATES

[75] Inventors: Tadao Toyama; Kesanao Kobayashi, both of Shizuoka, Japan

[73] Assignee: Fuji Photo Film Co., Ltd., Kanagawa, Japan

[21] Appl. No.: 881,272

[22] Filed: Jul. 2, 1986

[30] Foreign Application Priority Data

Jul. 4, 1985 [JP] Japan ............................. 60-147458

[51] Int. Cl.$^4$ .......................... C09D 5/20; C08L 3/00; G03F 7/00
[52] U.S. Cl. ...................................... 106/2; 106/210; 106/213; 101/450.1; 101/451; 536/111; 430/309
[58] Field of Search ................... 106/2, 210–213; 536/50, 111; 101/450.1, 451; 430/309

[56] References Cited

U.S. PATENT DOCUMENTS

| | | | |
|---|---|---|---|
| 2,520,161 | 8/1950 | Moe | 536/50 |
| 2,589,313 | 3/1952 | Wood | 101/149.2 |
| 3,745,028 | 7/1973 | Rauner | 536/50 |
| 3,870,527 | 3/1975 | Kryger | 106/2 |

FOREIGN PATENT DOCUMENTS 1098980  1/1966  United Kingdom .

*Primary Examiner*—Theodore Morris
*Attorney, Agent, or Firm*—Burns, Doane, Swecker & Mathis

[57] ABSTRACT

A desensitizing gum containing water-soluble carboxy alkylated starch wherein the carboxy alkyl group number of said carboxy alkylated starch is from 0.03 to 0.5. The desensitizing gum has desensitizing ability comparable to gum arabic.

15 Claims, No Drawings

DESENSITIZING GUM FOR PLANOGRAPHIC PRINTING PLATES

BACKGROUND OF THE INVENTION

1. Field of the Invention

This invention relates to a desensitizing gum for planographic printing plates.

2. Description of the Prior Art

In the final step of a process for making planographic printing plates, a protective coating composition, a so-called desensitizing gum, is applied to the plate surface for protecting the plate from contamination and scratching during storage. This step is called "a gumming-up" step. The most important purpose of gumming-up is to prevent the plate surface from being brought into contact with air and to thereby prevent the hydrophilic property in non-image areas from being reduced due to air oxidation, as well as to increase hydrophilicity. Thus, the gumming-up step is an essential step in making printing plates.

As a desensitizing gum, there has been used about 15 to 30 wt. % aqueous solution of gum arabic optionally containing surfactants, pH regulating agents, preservatives, etc.

However, gum arabic is a natural product which is produced only in restricted areas of the world, and therefore, the yield of gum arabic depends on the weather in such areas, which makes the supply thereof unstable.

For this reason, many attempts have been made to use as a desensitizing gum for printing plates various water-soluble organic high molecular compounds instead of gum arabic. For example, British Pat. No. 2,010,298 discloses dextrin, arabogalactan, arginic acid salts, polyacrylic acids, hydroxyethyl cellulose, polyvinyl pyrrolidone, polyacrylamide, methyl cellulose, hydroxypropyl cellulose, hydroxymethyl cellulose, and carboxyalkyl cellulose salts; U.S. Pat. No. 4,095,525 discloses pullulan and its derivatives, and; U.S. Pat. No. 4,349,391 discloses polyvinyl alcohol, all of which are inferior to gum arabic in ability of desensitizing non-image areas.

SUMMARY OF THE INVENTION

Accordingly, an object of this invention is to provide a desensitizing gum for printing plates, which has improved desensitizing ability.

The present inventors conducted studies to accomplish the aforesaid object and found that the object can be attained by the use of specific carboxy alkylated starch as a water-soluble organic high molecular compound. U.S. Pat. No. 2,589,313 discloses the use of carboxy alkylated starch as a desensitizing gum for printing plates but it fails to disclose details of the structure of the carboxy alkylated starch.

The present inventors studied various kinds of carboxy alkylated starches having different structures and found that only the following carboxy alkylated starches can attain the object of the invention. Thus, the invention provides a desensitizing gum for planographic printing plates, which comprises a water-soluble carboxy alkylated starch having 0.03 to 0.5 of the number of carboxy alkyl groups introduced into one glucose unit of the starch (hereinafter referred to as "the carboxy alkyl group number"). Preferably, at least 90 wt. % of the starch skeleton of the carboxy alkylated starch is of amylopectin type.

DETAILED DESCRIPTION OF THE INVENTION

Specific examples of the carboxy alkylated starch used in the invention include carboxy methylated starch, carboxy ethylated starch and carboxy propylated starch. Carboxy methylated starch is preferred. These carboxy alkylated starches can be prepared by reacting a starch suspension in an alkaline solution with monochloro carboxylic acid, such as monochloro acetic acid, monochloro propionic acid, monochloro butyric acid, etc. The number of carboxy alkyl groups introduced into one glucose unit in the starch depends on the type of starch, reaction ratio of monochloro carboxylic acid, reaction conditions, etc. Theoretically, it is possible to substitute all three hydroxyl groups of one glucose unit in the starch, i.e., to obtain carboxy alkylated starch having 3 of the carboxy alkyl group number. The carboxy alkyl group number can be determined by neutralization titration of carboxy alkylated starch, the carboxy groups of which have been converted into a free carboxylic acid form. The present inventors used, as a desensitizing gum, an aqueous solution of carboxy methylated starches having various carboxy alkyl group numbers and found that those having 0.03 to 0.5 of the carboxy alkyl group number give good results. Preferably the carboxyl alkyl group number is 0.05 to 0.3. Less than 0.03 of the number gives only the same level desensitizing ability as that of normal soluble starch and dextrin and therefore cannot attain the object of this invention. On the other hand, more than 0.5 gives printing plates which easily produce background contamination on printed matters after the plates have been stored under severe conditions of high temperature, high moisture, etc.

Two kinds of starch structures are known. One is of amylase type having a straight chain structure of glucose units linked together through 1,4-glucoside linkage and the other of amylopectin type having a branched chain structure of glucose units linked together mainly through 1,4-glucoside linkage and through 1,6-glucoside linkage. It is said that normal starch consists of 20 wt. % of amylase type structure and 80 wt. % of amylopectin type structure.

The present inventors used, as a desensitizing gum, mixtures of carboxy methylated starches of amylase and amylopectin types in various ratios and they found that carboxy methylated starch having at least 90 wt. % of amylopectin type structure gives a desensitizing gum with good desensitizing ability. Preferred is carboxy methylated starch having 100 wt. % of amylopectin type.

The term "water-soluble" used in this specification means both cold water-soluble and hot water-soluble.

Typically, the carboxyl groups of carboxy alkylated starch are in the form of sodium or potassium salt which are suitably used in this invention.

In this invention, other water-soluble organic high molecular compounds may be used in combination with the carboxy alkylated starch. Such high molecular compounds include cellulose derivatives such as methyl cellulose, ethyl cellulose, hydroxyethyl cellulose, or carboxymethyl cellulose, starch derivatives such as roast starch, α-starch, dextrin, or dialdehyde starch; natural or semi-synthetic high molecular compounds such as an alginic acid salt, locust bean gum, arabogalactan, pullulan, etc. Further, other high molecular compounds such as polyvinyl alcohol, polyvinyl pyrrolidone, polyacryl amide, polyvinyl methyl ether, polyethylene oxide, a copolymer of vinyl methyl ether and maleic anhydride, a copolymer of vinyl acetate and maleic anhydride, etc. may be used in combination with the carboxy alkylated starch. Of these, dextrin, roast starch, pullulan, polyvinyl alcohol and polyvinyl pyrrolidone are preferred. When gum arabic is used in combination, it can be used in a much smaller amount than usual to attain the object of this invention. The total amount of water-soluble high molecular compounds including the carboxy alkylated starch based on the total weight of the desensitizing gum of this invention is preferably 5 to 40 wt. %, and particularly 5 to 20 wt. %. The amount of the carboxy alkylated starch based on the total weight of the desensitizing gum is preferably about 0.1 wt. % to about 40 wt. %, and particularly 0.5 to 25 wt. %. Generally, the desensitizing gum is advantageously used in an acidic condition, i.e., pH 2.5 to 6.0. For making the pH of the desensitizing gum 2.5 to 6.0, a mineral acid, an organic acid or an inorganic salt is added to the desensitizing gum in an amount of, usually, 0.01 to 2 wt. %.

Such organic acids include citric acid, acetic acid, oxalic acid, malonic acid, p-toluene sulfonic acid, tartaric acid, malic acid, lactic acid, levulinic acid, organic phosphonic acid and such mineral acids include nitric acid, sulfuric acid and phosphoric acid. Two or more of the mineral acids, organic acids or inorganic salts can be used in combination.

The desensitizing gum may contain a surfactant to improve the surface properties of the coating. Such surfactants include those of anionic and nonionic types.

Anionic surfactants include aliphatic alcohol sulfonic ester salts, aliphatic alcohol phosphoric ester salts, sulfonic acid salts of dibasic aliphatic acid esters, aliphatic amide sulfonic acid salts, alkyl aryl sulfonic acid salts, and formaldehyde condensed napthalenesulfonic acid salts.

Such nonionic surfactants include polyethylene glycol alkyl ethers, polyethylene glycol alkyl esters, sorbitan alkyl esters, and polyoxypropylene polyoxyethylene ethers. Two or more of these surfactants may be used together. The amount of these surfactants added is not particularly restricted but is preferably 0.01 to 10 wt. % based on the weight of the desensitizing gum.

In addition to the above components, a lower polyol such as glycerin, ethylene glycol, triethylene glycol may be used as a wetting agent. The amount of wetting agent contained is suitably 0.1 to 5.0 wt. %, preferably 0.5 to 3.0 wt. %. Further, the desensitizing gum may contain antiseptics such as benzoic acid or its derivatives, phenol, formalin, sodium dehydroacetate, etc. in an amount of 0.005 to 2.0 wt. %.

The desensitizing gum of this invention can be applied to various planographic printing plates, particularly those obtained by image-wise exposing a presensitized plate comprising an aluminum support having coated thereon a light-sensitive layer, and developing the exposed plate. Suitable examples of the presensitized plate include one comprising an aluminum support having coated thereon a light-sensitive layer comprising a mixture of diazo resin (a salt of a condensate of p-diazodiphenylamine and paraformaldehyde) and shellac described in British Patent No. 1,350,521, a negative working presensitized plate comprising an aluminum support having provided thereon a light-sensitive layer comprising a mixture of diazo resin and a polymer having, as a main repeating unit, hydroxyethyl methacrylate unit or hydroxyethyl methacrylate described in British Patent Nos. 1,460,978 and 1,505,739, and; a positive working presensitized plate comprising an aluminum plate having provided thereon a light-sensitive layer comprising a mixture of o-quinone diazide and phenolic novolak described in U.S. Pat. Nos. 4,123,279 and 4,259,434. Also preferred are a presensitized plate comprising an aluminum support having provided thereon a light-sensitive layer comprising photo-cross-linking polymer described in U.S. Pat. No. 3,860,426, a presensitized plate comprising an aluminum support having provided thereon a light-sensitive layer comprising photopolymerizable polymer composition described in U.S. Pat. Nos. 4,072,527 and 4,072,528 and a presensitized plate comprising an aluminum support having provided thereon a light-sensitive layer comprising a mixture of water-soluble polymer and azide described in British Patent 1,235,281 and 1,495,861.

The desensitizing gum of this invention may be applied to the surface of a printing plate, for example, as follows.

A presensitized plate is image-wise exposed to light and developed to prepare a planographic printing plate. The printing plate is washed with water which is then squeezed. An appropriate amount of the desensitizing gum of the invention is poured on the printing plate and extended all over the plate surface with a sponge, whereby non-image areas on the plate surface are protected by the desensitizing gum. The plate thus treated can be stored. Before the press operation, the desensitizing gum applied on the plate surface is removed by water washing, then printing is carried out according to conventional procedures. An automatic gum coater can be used to uniformly apply the desensitizing gum to the plate surface. Satisfactory clear prints can be obtained immediately after printing starts, with few inferior prints, unlike the prior art.

The invention is illustrated by the following nonlimitative examples in which precent (%) is by weight unless otherwise indicated.

EXAMPLES 1 TO 12 AND COMPARATIVE EXAMPLES 1 TO 3

100 parts by weight of each of various carboxy methylated starches having the structure and composition as shown in Table 1 was dissolved in 740 parts by weight of pure water. For comparison, 100 parts by weight of each of gum arabic, roast dextrin (trademark: CREAM DEXTRIN #5 produced by MATSUTANI KAGAKU CO.), and enzymatically hydrolyzed dextrin (trademark: AMYCOL 6H produced by NICHIDEN KAGAKU CO.) was separately dissolved in 740 parts by weight of pure water.

Each of these aqueous solutions was added with 5 parts by weight of 35% sodium isopropylnaphthalene sulfonate aqueous solution (anionic surfactant) and 0.3 part by weight of sodium dehydroacetate and adjusted to pH3.5 with 85% phosphoric acid to obtain desensitizing gum samples. A 0.24 mm thick aluminum plate was degreased in 7% trisodium phosphate aqueous solution at 60° C., washed with water and grained with pumice-water suspension and a nylon brush. The plate was then immersed in 5% potassium silicate ($SiO_2/K_2O$ molar ratio: 2.0) aqueous solution at 70° C. for 30 to 60 seconds, washed with water and then dried.

To the plate, there was applied a light-sensitive solution consisting of 2.0 parts by weight of 2-hydroxyethyl methacrylate copolymer (prepared by the method described in EXAMPLE 1 of British Patent No. 1,505,739), 0.12 part by weight of 2-methoxy-4-hydroxy-5-benzoylbenzene sulfonic acid salt of a condensate of p-diazodiphenylamine and paraformaldehyde, 0.03 part by weight of OIL BLUE #603 (produced by ORIENT KAGAKU KOGYO), 15 parts by weight of 2-methoxy ethanol, 10 parts by weight of methanol and 5.0 parts by weight of ethylene chloride so as to obtain 1.8g/m² coating after drying. The presensitized plate thus prepared was exposed to light through a dotted negative film, developed with an aqueous developer consisting of 3.0 parts by weight of sodium sulfite, 30.0 parts by weight of benzylalcohol, 20.0 parts by weight of triethanolamine, 5 parts by weight of monoethanolamine, 10 parts by weight of sodium t-butylnaphthalene sulfonate and 1000 parts by weight of pure water, washed with water and dried.

The printing plate thus prepared was coated with the desensitizing gum and excess gum was wiped off with a cloth to obtain a finished printing plate.

A disensitizing ability of these plates was evaluated as follows. The plates were stored at 35° C. and 85% RH for 3 days and then installed in a printing machine (HAMADA STAR 900 CD-X offset printing machine). After printing was carried out to obtain 1000 copies in a conventional manner, supply of dampening water and printing paper was stopped. Ink was applied to the whole surface of the printing plates and then printing was again carried out in the same manner. In the printing plates treated with a desensitizing gum having good desensitizing ability, such as gum arabic, ink applied to nonimage areas was immediately removed and clear prints were obtained after printing was started again. In contrast, in the printing plates of COMPARATIVE EXAMPLES 2 and 3, ink applied to non-image areas was not easily removed and 25 copies were required before a clear print was obtained. As shown in Table 1, among the desensitizing gums containing carboxy methylated starch, those having 0.03 to 0.5 of the carboxy methyl group number gave good results and those containing more than 90% of amylopectin type were found to have desensitizing ability comparable to that of gum arabic.

TABLE 1

| | Carboxy methylated starch | | Desensitizing ability |
|---|---|---|---|
| | Carboxy methyl group number | Amylose/Amylopectin (wt. ratio) | |
| Example | | | |
| 1 | 0.025 | 20/80 | C~D |
| 2 | 0.035 | 20/80 | B~C |
| 3 | 0.07 | 20/8 | B |
| 4 | 0.13 | 20/80 | B |
| 5 | 0.2 | 20/80 | B~C |
| 6 | 0.5 | 20/80 | C |
| 7 | 0.7 | 20/80 | C~D |
| 8 | 0.2 | 100/0 | C |
| 9 | 0.2 | 50/50 | C |
| 10 | 0.2 | 15/85 | B~C |
| 11 | 0.2 | 10/90 | B |
| 12 | 0.2 | 0/100 | A |
| Comparative Example | | | |
| 1 | Gum arabic | | B |
| 2 | CREAM DEXTRIN #5 | | D |
| 3 | AMYCOL 6H | | D |

A very good
B good
C bad
D very bad

EXAMPLE 13

150 parts by weight of carboxy methylated starch (carboxy methyl group member: about 0.3, amylopectin: almost 100%, viscosity of 5% aqueous solution (25° C.): 15 cps), 5.0 parts by weight of 40% sodium alkyldiphenylether disulfonate aqueous solution, 0.2 part by weight of p-oxybenzoic acid ether, 2.0 parts by weight of citric acid and 2.0 parts by weight of diammonium hydrogen phosphate were dissolved in 790.8 parts by weight of pure water to obtain a desensitizing gum.

One part by weight of naphthoquinone-1,2-diazido-5-sulfonic ester of polyhydroxyphenyl prepared by polycondensation of pyrogallol and acetone described in U.S. Pat. No. 3,635,709 and 2 parts by weight of novolak type cresolformaldehyde resin were dissolved in 40 parts by weight of methyl cellosolve to prepare a light-sensitive solution. A 0.2 mm thick aluminum plate was grained, washed with water and dried. The light-sensitive solution was coated on the aluminum plate using a whirler so as to result in a weight of about 2.0g/m² after drying and dried to prepare a positive working presensitized plate. The plate was exposed to light through a dotted positive film, developed with 3% sodium silicate aqueous solution, washed with water and dried.

The presensitized plate was divided into two plates, one was coated with the desensitizing gum described above, and the other with gum arabic of COMPARATIVE EXAMPLE 1.

Two plate samples were stored in a chamber at 45° C. and 85% RH for 7 days, then installed in HEIDELBERG KOR-D printing machine and printing was carried out in a conventional manner.

Each plate gave 100,000 clear prints without contamination. The printing plate using the desensitizing gum of the invention was found to have desensitizing ability comparable to the desensitizing gum comprising gum arabic.

EXAMPLE 14

50 parts by weight of carboxy methylated starch (amylopectin type, carboxy methyl group number: 0.25, viscosity of 5% aqueous solution (25° C.): 300 cps), 150 parts by weight of enzymatically hydrolyzed dextrin (trademark: AMYCOL 1B produced by NICHIDEN KAGAKU CO.), 5.0 parts by weight of 40% sodium alkyldiphenylether disulfonate aqueous solution, 0.2 part by weight of p-oxybenzoic acid ether, 2.0 parts by weight of citric acid and 2.0 parts by weight of diammonium hydrogen phosphate were dissolved in 790.8 parts by weight of pure water to prepare a desensitizing gum.

The same procedures as those above were repeated except that carboxy methylated starch was not used and 200 parts by weight of enzymatically hydrolyzed dextrin (AMYCOL 1B) was used.

A printing plate prepared in the same manner as in EXAMPLE 1 was coated with the desensitizing gum using a G-800 gum coater (produced by FUJI PHOTO FILM CO., LTD.) and dried to prepare a finished printing plate.

The printing plates thus prepared were stored in a chamber at 45° C. and 85% RH for 3 days and installed in a HEIDELBERG KOR-D printing machine. In the same manner as in EXAMPLE 1, ink removing test was conducted to evaluate desensitizing ability of these samples.

The plate treated with the desensitizing gum containing carboxy methylated starch required 12 prints before ink on non-image areas was removed to obtain a clear print, while the plate treated with the desensitizing gum containing only enzymatically hydrolyzed dextrin required 25 prints before a clear print was obtained.

Thus, the desensitizing gum of the present invention has desensitizing ability comparable to gum arabic.

We claim:

1. A desensitizing gum containing water-soluble carboxy alkylated starch wherein the carboxy alkyl group number of said carboxy alkylated starch is from 0.03 to 0.5, and wherein about 90 wt. % or more of the starch skeleton of said carboxy alkylated starch is of amylopectin type.

2. The desensitizing gum of claim 1, wherein it further contains a surfactant in an amount of 0.01 to 10 wt. %.

3. The desensitizing gum of claim 1, wherein said carboxy alkylated starch is carboxy methylated starch.

4. The desensitizing gum of claim 1, wherein the carboxy alkyl group number is from 0.05 to 0.3.

5. The desensitizing gum of claim 1, wherein said carboxy alkylated starch is contained in an amount of 0.1 to 40 wt. %.

6. The desensitizing gum of claim 1, wherein carboxyl groups of said carboxy alkylated starch are in the form of sodium or potassium salt.

7. The desensitizing gum of claim 1, wherein it further contains a water-soluble organic high molecular compound.

8. The desensitizing gum of claim 1, wherein it has a pH of 2.5 to 6.0.

9. In a gumming-up process comprising applying to an imagewise exposed and developed presensitized plate, a desensitizing gum comprising water having dissolved therein 5 to 40 wt. % of a water-soluble high molecular compound, the improvement characterized in that said water-soluble high molecular compound comprises about 0.1 to 40 wt. %, based on the total weight of the gum, of a water-soluble carboxy alkylated starch wherein the carboxy alkyl group number of said carboxy alkylated starch is from 0.03 to 0.5, and wherein about 90 wt. % or more of the starch skeleton of said alkylated starch is of amylopectin type.

10. The process of claim 9, wherein said gum further comprises a lower polyol.

11. The process of claim 9, wherein said gum further contains at least one of anionic and nonionic surfactant.

12. The process of claim 9, wherein said carboxy alkylated starch is carboxy methylated starch.

13. The process of claim 9, wherein the carboxy alkyl group number is from 0.05 to 0.3

14. The process of claim 9, wherein said water-soluble high molecular compound further contains at least one of dextrin, roast starch, pullulan, polyvinyl alcohol, polyvinyl pyrrolidone or gum arabic.

15. The process of claim 9, wherein said gum further comprises a pH adjusting agent to make the pH of the gum in the range between 2.5 and 6.0.

* * * * *